United States Patent
Gray

[11] Patent Number: 5,146,873
[45] Date of Patent: Sep. 15, 1992

[54] FREEZELESS ANIMAL WATERER

[76] Inventor: Donald E. Gray, R.R. 4, Box 313A, West Burlington, Iowa 52655

[21] Appl. No.: 722,508

[22] Filed: Jun. 27, 1991

[51] Int. Cl.$^5$ ............................................. A01K 7/06
[52] U.S. Cl. ........................................................ 119/73
[58] Field of Search ............................. 119/73, 75, 78

[56] References Cited

U.S. PATENT DOCUMENTS

| | | | |
|---|---|---|---|
| 2,512,510 | 6/1950 | Wartes | 119/73 |
| 2,623,500 | 12/1952 | Riley et al. | |
| 2,678,026 | 5/1954 | Rue et al. | |
| 3,691,997 | 9/1972 | Hatch | 119/73 X |
| 3,949,707 | 4/1976 | Armstrong et al. | 119/73 |
| 4,091,261 | 5/1978 | Noland | 219/301 |
| 4,218,607 | 8/1980 | Noland | 219/301 |
| 4,248,177 | 2/1981 | Peterson et al. | 119/73 |
| 4,584,966 | 4/1986 | Moore | 119/73 |
| 4,813,373 | 3/1989 | Lapp | 119/73 |
| 4,962,730 | 10/1990 | Schafer | 119/73 |

Primary Examiner—Gene Mancene
Assistant Examiner—Thomas Price
Attorney, Agent, or Firm—Zarley, McKee, Thomte, Voorhees, & Sease

[57] ABSTRACT

A freezeless animal waterer has a vertical container having a top, bottom, sidewalls and an interior compartment. A vertical tube is located within the compartment and extends upwardly from the bottom to the top of the container with both the top and the bottom of the vertical tube being open. A pressurized water supply pipe extending from a riser tube in the ground extends through the vertical tube, and upwardly out of the upper end thereof, and thence downwardly back into the container and into the interior compartment, and terminates in an outlet opening. The cross sectional area of the pressurized water supply pipe is less than that of the vertical tube or the riser tube. An electrical heating element is positioned in the compartment to warm the water therein. At least one animal operable watering valve is located in the sidewall of the container to permit animals to selectively withdraw water from the compartment.

7 Claims, 1 Drawing Sheet

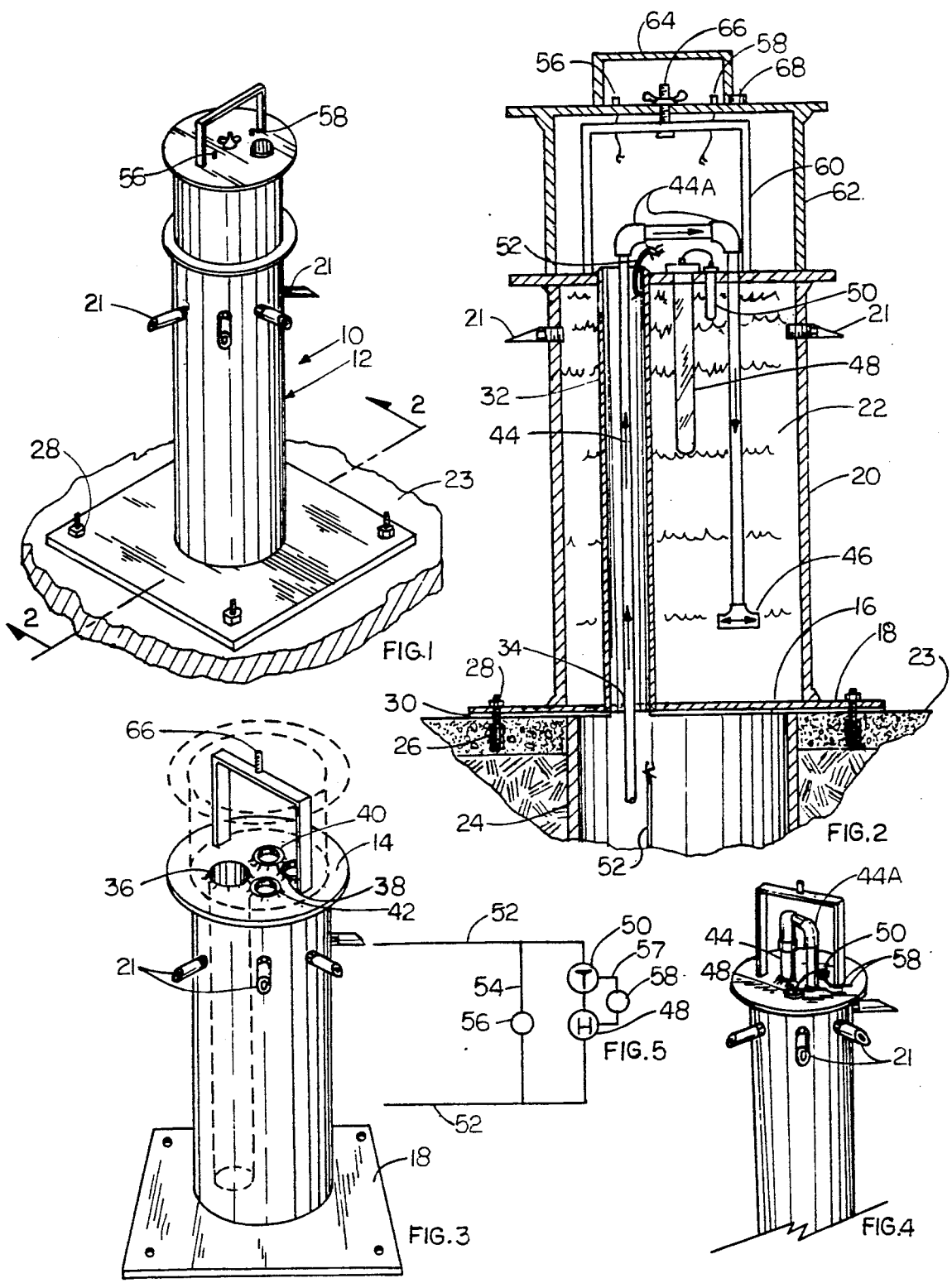

FREEZELESS ANIMAL WATERER

BACKGROUND OF THE INVENTION

Freezing of swine waterers in geographic areas where winter temperatures often fall below the freezing point of water creates substantial problems for the swine producer. The water systems both above and below ground must be protected to prevent freezing.

Existing animal waterers are susceptible to freezing because they do not take advantage of the latent heat in the water which emerges from the ground pipes at a temperature of approximately 55° F.

In addition, existing animal waterers are often difficult to install or service, particularly in very cold weather.

It is therefore a principal object of this invention to provide a freezeless animal waterer which will use the latent heat in ground water to prevent freezing of the water inlet line both above and below the ground.

A further object of this invention is to provide a freezeless animal waterer which can be easily installed and serviced, even in freezing weather.

A still further object of this invention is to provide a freezeless animal waterer which will not allow the animals to drink the water reservoir dry even if the water supply fails so as to protect the water heating elements from being damaged.

These and other objects will be apparent to those skilled in the art.

SUMMARY OF THE INVENTION

The freezeless animal waterer of this invention comprises a vertical container having a top, bottom, sidewalls and an interior compartment. A vertical tube is located within the compartment and extends upwardly from the bottom to the top of the container with both the top and the bottom of the vertical tube being open. A pressurized water supply pipe extending from a riser tube in the ground extends through the vertical tube, and upwardly out of the upper end thereof, and thence downwardly back into the container and into the interior compartment, and terminates in an outlet opening. The cross sectional area of the pressurized water supply pipe is less than that of the vertical tube or the riser tube. An electrical heating element is positioned in the compartment to warm the water therein. At least one animal operable watering valve is located in the sidewall of the container to permit animals to selectively withdraw water from the compartment.

BRIEF DESCRIPTION OF THE DRAWINGS

FIG. 1 is a perspective view of the freezeless animal waterer of this invention;

FIG. 2 is an enlarged scale sectional view taken on line 2—2 of FIG. 1;

FIG. 3 is a perspective view of the freezeless animal waterer of FIG. 1, but with the top thereof removed to more fully illustrate its construction;

FIG. 4 is a partial perspective view shown at a slightly smaller scale and similar to that of FIG. 3, but with the water line, heating element and thermostat being installed; and FIG. 5 is a schematic wiring diagram of the electrical circuitry involved in this invention.

DESCRIPTION OF THE PREFERRED EMBODIMENT

The numeral 10 designates the freezeless animal waterer of this invention which is comprised of container 12 which has a top 14 (FIG. 3), a bottom 16 (FIG. 2) comprised of base plate 18, and sidewall 20. Typical nipple animal drinking valves 21 are threadably inserted in the sidewall 20. The valves 21 are operated by the animals and permit the animals to selectively gain access to the water within compartment 22 in the interior of container 12.

Waterer 10 is typically mounted on a concrete slab 23 which surrounds a riser tube 24 which typically is in communication with a source of pressurized water. The waterer 10 is mounted on concrete slab 23 by means of concrete anchors 26 and bolts 28 which extend through suitable apertures (not shown) in plate 18. A sealing layer 30 is typically mounted between the lower surface of plate 18 and the upper surface of the concrete slab 23.

A vertical tube 32 with an open bottom 34 extends upwardly from the bottom 16 of container 12 to the top 14 thereof and terminates in open aperture 36. The top 14 also includes apertures 38, 40 and 42 (FIG. 3). A water supply pipe 44 extends upwardly out of riser tube 24 and through vertical tube 32, thence laterally over the top 14 and downwardly through aperture 38 into compartment 22 where it terminates in an outlet end 46. The outlet end 46 dwells at a level slightly above the bottom 16 and at an elevation substantially below the nipple valves 21.

An electrical heating element 48 is tightly mounted in aperture 42, and a conventional thermostat 50 is mounted in aperture 40 of top 14, with both the heating element 48 and the thermostat 50 extending downwardly into compartment 22 for direct exposure to any water within the compartment. A power line 52 connects the heating element 48 and thermostat 50 in series. A line 54 is connected in parallel with respect to the heating element 48 and the thermostat 50, and power indicator light 56 is imposed in line 54. Line 57 interconnects heater element 48 and thermostat 50, and thermostat indicator light 58 is imposed in line 57.

An inverted U-shaped bracket 60 is welded on top 14 (FIGS. 3 and 4), and closed cap 62 fits over bracket 60 and rests on top 14 of container 12. An inverted U-shaped handle 64 is welded or otherwise secured to the top of cap 62. A bolt assembly 66 (FIG. 2) interconnects bracket 60 and cap 62. An aperture 68 appears in the top of cap 62 and is available either for bringing in electrical power lines into the unit, or can be used for introducing a pressurized water line for use in those instances where freezing weather is not a problem. When the unit is used in a freezing environment, the aperture 68 is preferably closed by any convenient means.

The water entering the unit through water supply pipe 44 will typically be at a temperature of approximately 55°. The pipe 44 extends above top 14 of container 12 to permit suitable pipe couplings 44A to be utilized to facilitate installation or repair. The location of the outlet 36 of pipe 44 at a level below nipple valves 21 insures that if the water supply should be turned off for any reason, the animals could not drink the compartment 22 dry at a level below the nipples. This means that the heating element 48 and thermostat 50 would therefore always be at least partially immersed in water and would not be burned out under those circumstances.

The heating element 48 elevates the temperature of the water in the compartment 22 to a temperature above 55°. The heated water, by conduction, heats the air in the interior of vertical pipe 32, and the heated interior of the vertical pipe 32 warms not only the interior of cap 62, but the interior of riser tube 24.

With reference to FIG. 2, the power lines 54 and 57 which extend from indicator lights 56 and 58 respectively, can have suitable connectors imposed therein to accommodate the removal of cap 62 at times. These indicator lights reveal to the operator that electrical power to the system is in place and that the thermostat is in fact in operable condition.

From the foregoing, it is seen that this invention will achieve at least its stated objectives.

I claim:

1. A livestock waterer, comprising, a vertical container having a top, bottom, sidewalls and an interior compartment,
    a vertical tube in said compartment extending upwardly from said bottom, said tube having an open bottom adapted to communicate with a water riser tube,
    a pressurized water supply pipe in said vertical tube and having a cross sectional area less than that of said vertical tube, said pipe having an outlet opening in said compartment,
    a heating element in said compartment to warm water therein,
    and at least one animal operable watering valve in said container to permit animals to selectively withdraw water from said compartment.

2. The device of claim 1 wherein a thermostat is connected to said heating element to permit control of the temperature of water in said compartment.

3. The device of claim 1 wherein a water riser tube having a cross sectional area greater than said water supply pipe is located below said container, and said water supply pipe extends through said water riser tube and into said vertical tube, whereby heat from the water in said compartment will be transmitted through said vertical tube to warm the air in said vertical tube and said water riser tube to prevent water in said water supply pipe from freezing.

4. The device of claim 1 wherein said watering valve is located at an elevation above said outlet opening of said water supply pipe.

5. The device of claim 1 wherein said vertical tube extends between said top and said bottom of said container, and said water supply pipe extends upwardly through said top of said container and thence downwardly therethrough into said compartment.

6. The device of claim 5 wherein a closed cap is detachably mounted on said top of said container.

7. A livestock waterer, comprising, a vertical closed container having a top, bottom, sidewalls and an interior compartment,
    a vertical tube in said compartment extending upwardly from said bottom, said tube having an open bottom adapted to communicate with a water riser tube,
    a pressurized water supply pipe in said vertical tube and having a cross sectional area less than that of said vertical tube, said pipe having an outlet opening in said compartment,
    a heating element in said compartment to warm water therein;
    and at least one animal operable watering valve extending through said sidewalls of said container to permit animals to selectively withdraw water from said compartment, when said compartment is filled with water to a level above said watering valve, only through said valves by engaging said valves outside said container without accessing the interior compartment of said container.

* * * * *